United States Patent
Fromont (10) Patent No.: US 6,851,396 B2
(45) Date of Patent: Feb. 8, 2005

(54) ON-BOARD FUEL FEED SYSTEM FOR A MOTOR VEHICLE

(75) Inventor: Jean-Sébastien Fromont, Chalons en Champagne (FR)

(73) Assignee: Marwal Systems, Chalons en Champagne (FR)

( * ) Notice: Subject to any disclaimer, the term of this patent is extended or adjusted under 35 U.S.C. 154(b) by 0 days.

(21) Appl. No.: 10/322,804

(22) Filed: Dec. 19, 2002

(65) Prior Publication Data

US 2003/0140872 A1 Jul. 31, 2003

(30) Foreign Application Priority Data

Dec. 20, 2001 (FR) .............................................. 01 16543

(51) Int. Cl.⁷ ............................................... F02M 25/00
(52) U.S. Cl. ...................................... 123/1 A; 137/264
(58) Field of Search ............................ 123/1 A, 198 A, 123/509, 73 AD, 25 R–25 Q; 137/264

(56) References Cited

U.S. PATENT DOCUMENTS

| | | | | |
|---|---|---|---|---|
| 3,818,876 A | * | 6/1974 | Voogd | 123/25 R |
| 4,030,453 A | * | 6/1977 | Sugimoto | 123/3 |
| 4,621,593 A | | 11/1986 | Rao et al. | |
| 6,068,672 A | * | 5/2000 | Watson et al. | 44/629 |
| 6,422,266 B1 | * | 7/2002 | Gouzou et al. | 137/565.22 |

FOREIGN PATENT DOCUMENTS

| EP | 0 488 831 A1 | 6/1992 |
|---|---|---|
| FR | 2 718 795 | 1/1995 |

* cited by examiner

Primary Examiner—Andrew M. Dolinar
Assistant Examiner—Katrina Harris
(74) Attorney, Agent, or Firm—Foley & Lardner LLP (57) ABSTRACT

The invention provides an on-board fuel feed system for a motor vehicle, including a fuel tank and device for introducing additive into the fuel, the device comprising an additive tank and pumping device for pumping the additive to direct it to an introduction point for introducing the additive into the fuel, wherein the additive tank is housed inside the fuel tank.

30 Claims, 6 Drawing Sheets

FIG.1

FIG_2

FIG.3

FIG_4

ON-BOARD FUEL FEED SYSTEM FOR A MOTOR VEHICLE

The invention relates to an on-board fuel feed system for a motor vehicle, the system being provided with means for introducing a fuel additive.

BACKGROUND OF THE INVENTION

The exhaust gas coming from a vehicle, and in particular a diesel-engined vehicle contains a certain amount of pollution, and in particular particles of soot. Recent anti-pollution standards applied to this type of engine require such particles of soot to be eliminated almost entirely from exhaust gas. This elimination is generally performed by means of a particle filter which tends to become clogged progressively while the engine is in operation, because of the presence of these particles. In order to clean the filter, it is necessary to burn the soot.

For this purpose, various additives are added to diesel fuel such as organo-metallic compounds which act as combustion catalysts for soot particles.

More generally, it is possible to add various additives to any type of fuel depending on the kind of vehicle engine, depending on requirements specified by the manufacturer, and depending on the need to comply with various pieces of anti-pollution legislation.

As a general rule, such additives are mixed in with the fuel during the industrial process of preparing the fuel, in refineries where petroleum fuels are produced.

Nevertheless, consideration has more recently been given to providing not only a fuel tank within a motor vehicle, but also a separate additive tank together with systems for introducing a measured quantity of the additive into the fuel tank. Such systems serve to control the quantity of additive that is added (generally in such a manner as to give a volume of additive that corresponds to the volume of fuel added to the tank).

Thus, document FR 2 718 795 discloses a motor vehicle fuel feed system that includes means for introducing additive into the fuel. The installation described in that document comprises firstly a fuel tank provided in conventional manner with a suction module designed to direct said fuel towards the site where it is used, and secondly an additive tank into which a suction module dips, which module is connected to an injector via an introduction duct. The injector is mounted on the top wall of the fuel tank and serves to inject additive directly into the tank. In addition, excess additive directed to the injector is recovered in a return duct fitted with a pressure regulator.

Document EP-0 488 831 describes an installation comprising firstly a pump for injecting fuel into the cylinders of an engine which is connected to a fuel tank via a suction pipe, and secondly an additive injector connected to an additive tank and to an electronic control unit. The injector enables additive to be injected directly into said suction pipe.

Simplified installations are also known in the prior art in which the additive pump and injector are replaced by a metering pump.

Thus, document U.S. Pat. No. 4,621,593 describes an installation comprising an additive tank connected to a fuel tank via a pipe having an electric pump mounted therein. The electric pump enables a measured quantity of additive to be introduced directly into the fuel tank. It is actuated by a control unit servo-controlled to a fuel gauge in the tank. Document DE 3 626 419 describes an installation that is similar except that the pump delivers the additive into a feed pipe for the fuel tank. Finally, document EP 0 269 228 discloses a pump which delivers the additive into the fuel return pipe that serves to return excess fuel from the engine to the fuel tank.

Nevertheless, those prior art systems require sufficient space to be available around the fuel tank for receiving the additive tank and the associated pumping means. Unfortunately, this space is not always available.

OBJECTS AND SUMMARY OF THE INVENTION

An object of the invention is thus to remedy those drawbacks.

To this end, the invention provides an on-board fuel feed system for a motor vehicle, the system comprising a fuel tank and means for introducing additive into the fuel, said means comprising an additive tank and pumping means for pumping said additive to direct it to an introduction point for introducing the additive into the fuel, wherein said additive tank is housed inside the fuel tank.

According to an advantageous characteristic of the present invention, the additive tank is made of polyoxymethylene.

According to another advantageous characteristic of the present invention, the fuel tank comprises at least two fuel-receiving compartments that are interconnected, a main compartment containing a main fuel-drawing module for drawing fuel for sending to its site of use, a secondary compartment containing a secondary fuel-drawing module provided with a baseplate for fixing to one of the walls of said secondary compartment and serving to draw the fuel contained in said secondary compartment to send it into the main compartment or into the main drawing module, the system being remarkable in that said additive tank is housed inside said secondary compartment of the fuel tank.

According to other advantageous but non-limiting characteristics of the invention:

- said additive pump means are received inside said additive tank;
- the additive tank is mounted on the fixing baseplate of a secondary drawing module;
- said additive pump means are constituted by a metering pump suitable for delivering a measured quantity of additive under the control of control means;
- said additive pump means are constituted by a suction pump, and the additive introduction point is an injector;
- the additive introduction point is situated on the baseplate of the main drawing module;
- the additive introduction point is situated on one of the walls of the main compartment;
- the system includes additive deflection means underlying the additive introduction point and designed to deflect the delivered additive to outside a reserve bowl of the main drawing module;
- the secondary drawing module includes a jet pump;
- said secondary drawing module includes fuel gauge means;
- the secondary drawing module is housed in a setback formed in the side wall of the additive tank;
- the additive tank contains a level sensor; and
- the secondary drawing module is mounted on equipment that is movable in vertical translation and that is urged towards the bottom of the fuel tank by resilient means.

BRIEF DESCRIPTION OF THE DRAWINGS

The invention is described below in greater detail with reference to the accompanying drawings given as non-limiting illustrative examples, and in which.

MORE DETAILED DESCRIPTION

Figure 1:
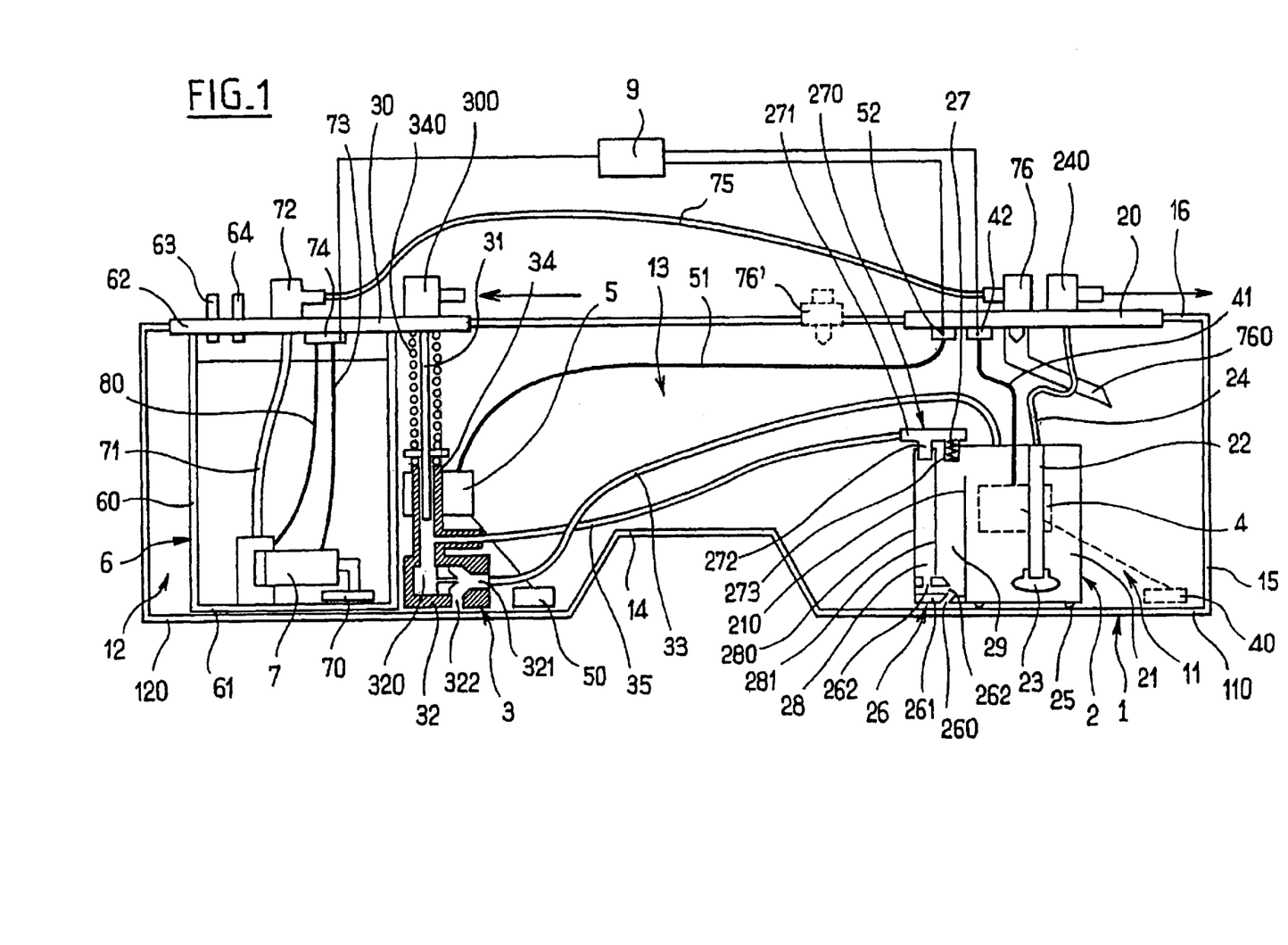
FIG. 1 is a diagrammatic side view in vertical section of a fuel tank fitted with additive-adding means in accordance with the present invention.

FIG. 1 shows a fuel tank 1 in accordance with the present invention. This tank essentially has a plurality of fuel-receiving compartments interconnected in the top portion of the tank at a distance from their respective bottoms.

The fuel tank 1 is thus of complex shape that matches the space available in the infrastructure of the vehicle. It is preferably made of plastics material.

In the particular embodiment shown in FIG. 1, the fuel tank 1 has two fuel-receiving compartments, namely a main compartment 11, and a secondary compartment 12, which compartments are interconnected via an intermediate chamber 13.

The two compartments 11 and 12 are thus separated by a ridge 14 situated beneath the chamber 13. The ridge 14 is preferably shaped to match the shape of a member of the vehicle that is situated beneath the fuel tank 1, for example a transmission shaft.

The bottoms of the main and secondary compartments 11 and 12 are given respective references 110 and 120. The side wall of the fuel tank 1 carries the reference 15, while the top wall carries the reference 16. In FIG. 1, the side wall 15 is shown as being vertical and the top wall 16 is shown as being plane. Nevertheless the respective shapes of these walls may be adapted to the space available within the motor vehicle.

The tank 1 further comprises a filling orifice that is not shown in the figures.

The main compartment 11 contains a main fuel-drawing module 2, while the secondary compartment 12 contains a secondary fuel-drawing module 3.

The main drawing module 2 may be constituted by any conventional module known to the person skilled in the art and it is therefore not described in detail below. An embodiment thereof is described briefly below.

The main drawing module 2 has a baseplate 20 enabling it to be fixed to the top wall 16 of the fuel tank 1. This module also has a reserve bowl 21 into which there dips a pump 22, generally an electrically controlled pump, and the inlet orifice of the pump is situated in the vicinity of the bottom of the reserve bowl 21 and is provided with a filter or strainer 23.

The outlet from the pump 22 is connected via a feed pipe 24 to an opening 240 provided in the baseplate 20 so that the fuel sucked in from the tank can be directed to its site of use, i.e. to the engine's carburetor or injector.

The main drawing module 2 is mounted at a small distance from the bottom 110 of the fuel tank, on legs referenced 15.

The reserve bowl 21 is filled by a jet pump 26 associated with a discharge valve 27.

The jet pump 26 has a suction duct 260 opening out facing the bottom 110 of the fuel tank 1 and having an outlet terminating in the body of the jet pump 26, downstream from a nozzle 261.

The inlet 262 to the jet pump 26 is connected to a feed duct 28 formed vertically inside the main module 2. More precisely, this vertical feed duct 28 is defined by one of the side walls 280 of the module 2 and by a parallel intermediate wall 281.

The outlet 262 from the jet 26 opens out into a vertical ejection duct 29 terminating in the reserve bowl 21. This duct 29 is parallel to the duct 28 and is defined by the above-mentioned intermediate wall 281 and by a parallel low wall 210. This low wall 210 is connected in leaktight manner at its sides and at its base to the walls that form the reserve bowl 21. Fuel coming from the jet pump 26 strikes the low wall 210. As a result, any bubbles of air present in the fuel are broken. This serves to degas the fuel. The fuel reaches the reserve bowl 21 proper by flowing over the low wall 210. This low wall also defines the maximum depth for fuel inside said reserve bowl.

A three-port coupling 270 is mounted in the top portion of the drawing module 2.

This coupling 270 has a horizontal inlet port 271 and two parallel vertical outlet ports 272 and 273. The outlet port 272 opens out into the feed duct 28, while the outlet port 273 which has the discharge valve 27 mounted therein opens out into the ejection duct 29.

The discharge valve 27 comprises a ball acting as a valve member, resting on a seat and subjected to opposing forces from a rated spring and from the pressure of the fuel penetrating into the coupling 270. The discharge valve 27 opens when the pressure of the fuel penetrating into the coupling 270 exceeds the rated threshold of the valve as defined by the spring. Otherwise, the discharge valve 27 is closed.

As shown in FIG. 1, the drawing module 2 may also be provided with means 4 for gauging the level of the fuel. The module 2 then constitutes a combined drawing and gauging module.

The gauging means 4 generally comprise a float 40 designed to track the level of fuel inside the tank 1 and associated with a slider guided to move along a resistive track so as to generate output information representative of the level and/or volume of fuel present in the tank 1 or solely in the main compartment 11.

These gauging means 4 may be replaced by any equivalent means known to the person skilled in the art, such as capacitive sensors, for example.

The gauging means 4 are also connected via a bundle of wires 41 to an electrical connector 42. The electrical connector 42 is connected firstly to the electrical power supply to said gauging module 4 and secondly to control means or a central unit 9 that receives the fuel level information as detected by the module 4.

Excess fuel that is not used in the vehicle engine is returned to the inside of the fuel tank 1, and more precisely into the secondary compartment 12 via a return opening 300 formed in the baseplate 30 of the secondary drawing module 3.

This opening 300 is connected to a return duct 31 that extends vertically inside the secondary compartment 12 to the inlet orifice 320 of a jet pump 32 disposed on the bottom 120 of the secondary compartment 12.

The outlet 321 of the jet pump 32 is connected via a return pipe 33 to the reserve bowl 21 of the main drawing module 2.

The jet pump 32 also has a suction duct 322 opening out in register with the bottom 120 of the secondary compartment 12.

Advantageously, the jet pump 32 is mounted on equipment 34 that is movable in vertical translation about the return duct 31 and that is urged downwards by resilient means or a helical spring 340. The helical spring 340 extends around the return duct 31. One of its ends is fixed to the top portion of the equipment 34 while its opposite end rests against the bottom face of the baseplate 30.

The secondary drawing module 3 also has a bypass pipe 35 whose inlet opens out upstream from the inlet orifice 320 of the jet pump 32 and whose outlet is connected to the three-port coupling 270.

In addition, the drawing module 3 may have gauging means 5 of structure that may be similar to that described for the gauging means 4 with a float 50 serving to detect the level of fuel inside the secondary compartment 12 or when the level of fuel throughout the entire fuel tank 1 is above the level of the ridge 14.

These gauging means 5 are connected via a bundle of wires 51 to an electrical connector 52 carried by the baseplate 20 and connected to the above-mentioned control means 9 (or central unit).

The means for introducing additive referred to as "additive-adding means" comprise an additive tank 6 and pump means 7 for sucking in the additive and introducing it into the fuel.

The additive tank 6 is generally cylindrical in shape having a side wall referenced 60 and closed at one of its ends so as to define a bottom wall 61. The top portion of the additive tank is closed by a baseplate 62 enabling said additive tank to be fixed to the top wall 16 of the fuel tank 1.

Advantageously, the baseplate 62 is the same baseplate as the baseplate 30 for the secondary drawing module 3.

The additive tank 6 further comprises a filling orifice 63 suitable for being closed by a stopper (not shown in the figure) and an endpiece 64 for venting and degassing.

The endpiece 64 is connected to a check valve, e.g. a ball valve or a two-port valve having a spring (not shown in the figure). This valve can perform several functions. For example, when the motor vehicle is exposed to high temperatures (in the summer, in the sun, for example) this valve can enable excess pressure inside the additive tank to be vented. Conversely, in the event of an accident, if the vehicle rolls over, the valve serves to close the nozzle 64 and prevent additive from flowing out from the tank 6.

The pump means 7 are constituted by a pump whose inlet orifice is provided with a filter 70 and whose outlet is connected by a pipe 71 having an outlet opening 72 secured to the baseplate 62.

The pump 7 is conventional and is not described in detail.

Its components must be capable of withstanding liquids, and more particularly the chemical aggressivity of additives.

It is generally constituted by an electric pump connected by a bundle of wires 73 to an electrical connector 74, secured to the baseplate 62. This electrical connector 74 is connected firstly to an electrical power supply and secondly to the above-mentioned control means 9.

The opening 72 is connected via a feed pipe 75 extending outside or inside the fuel tank 1 to the point 76 where the additive is introduced into the fuel tank 1.

This introduction point 76 may be situated in the baseplate 20 over the reserve bowl 21. Nevertheless, it is also possible to provide deflector means 760 beneath the outlet from said introduction point 76 and designed to deflect the delivered additive to outside the reserve bowl 21 of the main drawing module 2. These deflector means 760 can be constituted by a spout or a tube provided at its end with a nozzle.

In a variant shown in dashed lines, the introduction point may be situated in the top wall 16 of the fuel tank 1, preferably above the main compartment 11. It is then referenced 76'.

When the pump 7 is a metering pump, i.e. a pump capable of delivering a measured quantity of additive under control of the control means, the introduction points 76, 76' may be constituted merely by orifices, possibly fitted with check valves.

When the pump means 7 are constituted merely by a suction pump, then the introduction points 76, 76' are constituted by respective injectors with controlled opening times so as to determine the volume of additive that is added to the fuel. In a manner known to the person skilled in the art, an additive return duct is then provided associated with a rated valve whose function is to regulate the feed pressure to the injector, with surplus additive then being returned via the return duct. A variant consists in placing such a valve directly on the outlet from the pump, in which case the return duct is not needed, providing the surplus additive coming from the valve pours directly into the additive tank.

Figure 2:
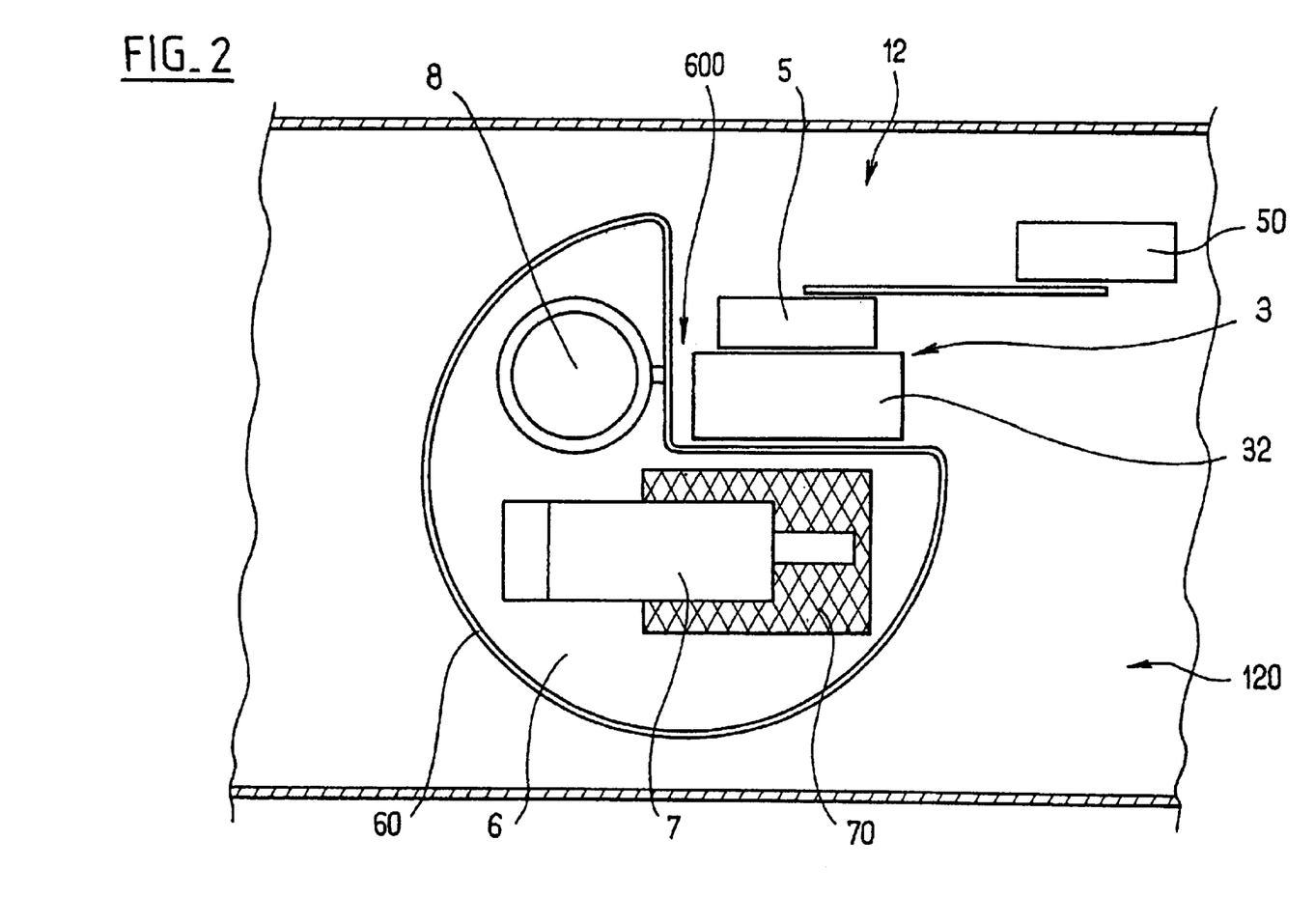
FIG. 2 is a plan view in section showing a variant embodiment of the additive-adding module, of the secondary fuel-drawing and gauging module, and of a portion of the fuel tank.

Finally, as can be seen solely in FIG. 2, it is possible to provide a sensor 8 inside the additive tank 6 for sensing the level of the additive.

Advantageously, the sensor 8 is a piezoelectric sensor. It is connected via a bundle of wires 80 (shown only in FIG. 1) to the above-mentioned electrical connector 74.

FIG. 2 shows a variant disposition for the various elements present inside the secondary compartment 12.

In this case, the side wall 60 of the additive tank 6 presents a setback 600, e.g. in the form of one-fourth of a circle, and this setback contains the secondary drawing module 3.

This disposition saves space compared with the disposition shown in FIG. 1 where the cylindrical additive tank 6 is disposed beside the secondary drawing module 3.

The operation of the system is described in detail below.

The fuel and additive tanks 1 and 6 are filled via the appropriate orifices.

The fuel present in the reserve bowl 21 is sucked in by the pump 22 and sent to the engine. Excess fuel that is not used by the engine is returned via the return duct 31. On penetrating into the jet pump 32, it establishes suction enabling the fuel present in the secondary compartment 12 to be sucked into the suction duct 322. The fuel is then returned to the reserve bowl 21 via the return pipe 33.

In addition, a fraction of the fuel coming from the pipe 34 is diverted by the diversion pipe 35 towards the inlet port 271 of the coupling 270. It flows into the feed duct 28 going towards the jet pump 26. On penetrating into the jet pump, it causes the fuel present in the main compartment 11 to be sucked into the suction duct 260. This fuel is then directed to the reserve bowl 21. In the event of the pressure being too high in the jet pump 26, the fuel passes through the discharge valve 27 and penetrates directly into the reserve bowl 21.

The control means 9 actuate the pump 7 as a function of information received, and in particular from the gauging means 4 and 5.

The additive is directed towards the introduction points 76, 76'.

The invention saves space since not only is the additive tank 6 housed inside the fuel tank, but so also are the pump means 7.

Figure 3:
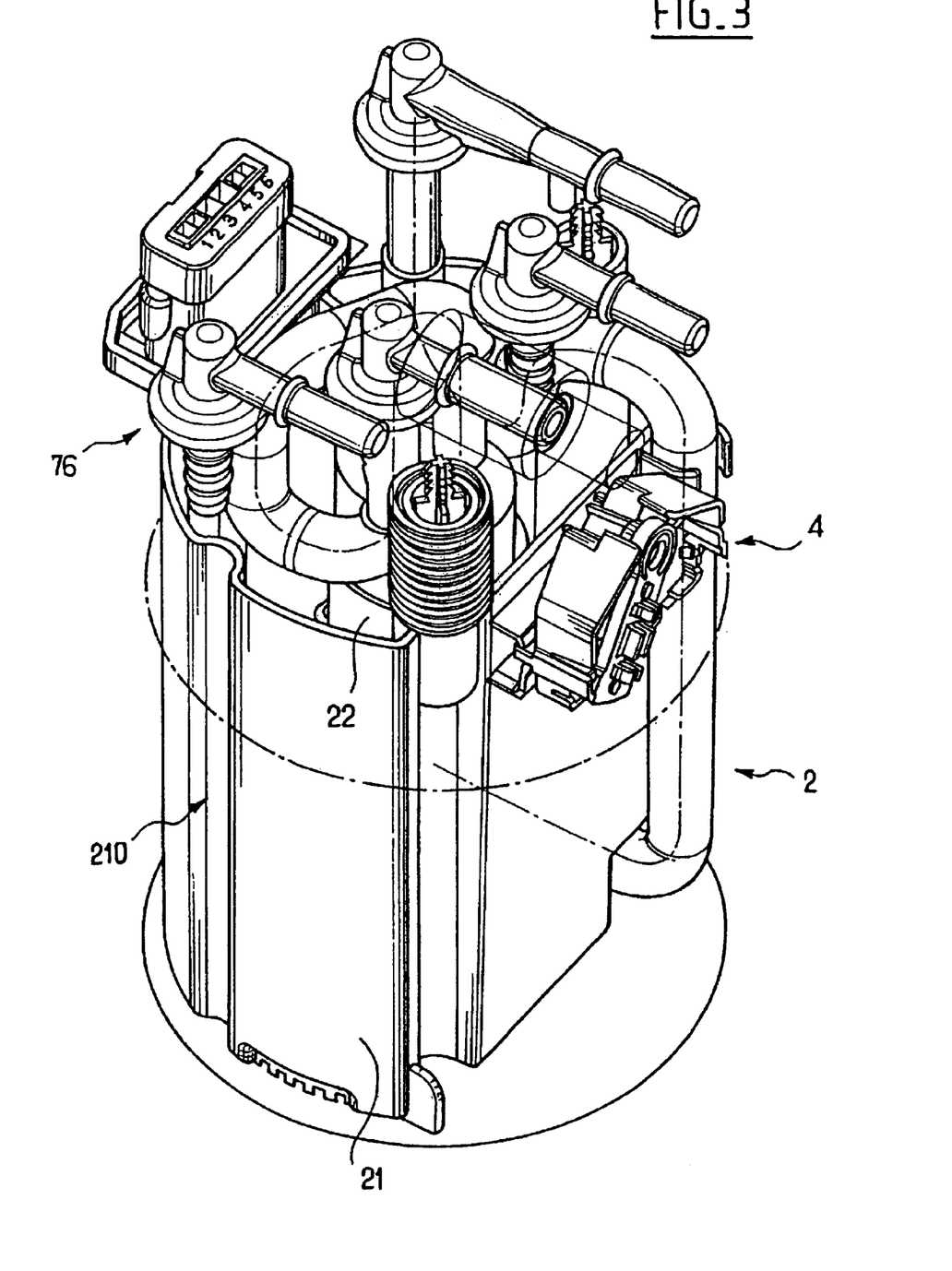
FIG. 3 is a perspective view of a particular embodiment of a main drawing module in accordance with the present invention.

FIG. 3 shows a main drawing module 2 and there can be seen in particular the reserve bowl 21 and a pump 22 and a gauge 4.

FIG. 3 also shows a coupling or pipette 76 supported by the baseplate 20 and designed to receive the additive coming from the pipe 75 so as to direct the additive into the main compartment 11 of the fuel tank. The pipette 76 is generally constituted by a 90° bend having a horizontal segment for connection to the pipe 75 and a vertical segment that opens out downwards into the fuel tank.

The pipette 76 is force fitted or heat sealed to the baseplate 20.

Figure 4:
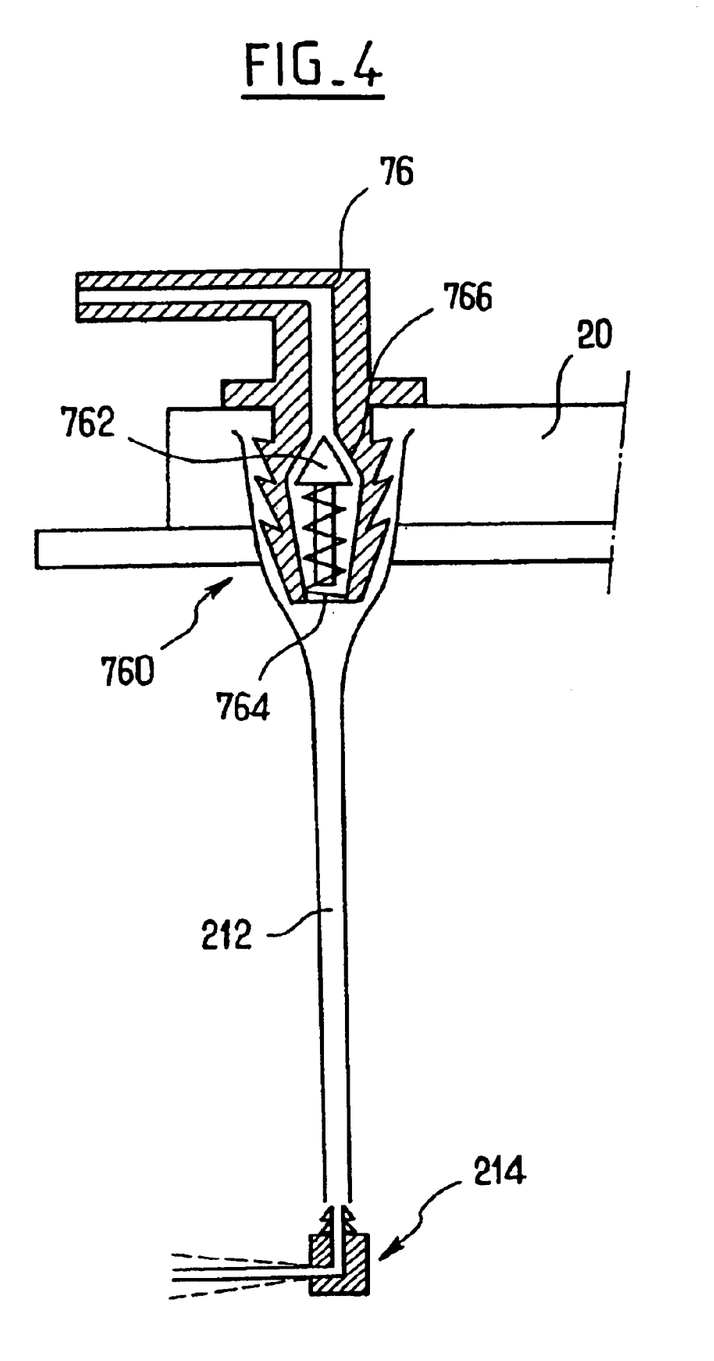
FIG. 4 is a fragmentary vertical section view of a variant embodiment of such a module.

As shown in FIG. 4, the pipette 76 preferably houses a check valve 760. This valve comprises a valve element 762 urged by a spring 764 against a seat 766 against the pressure of the additive introduced into the pipe 75. The valve 760 opens when the pressure of the additive in the pipe 75 exceeds the rated threshold defined by the spring 764. Otherwise the valve 760 is closed. The valve 760 thus closes automatically when the pump 7 stops. The valve 760 serves in particular to ensure that the pipe 75 is not emptied, and thus to avoid any mixing of fuel and additive inside the pipe 75, thus enabling additive to be measured out accurately.

The outlet from the pipette 76 is preferably placed facing a furrow 210 in the outside surface of the reserve bowl 21. Where appropriate, the outlet of the pipette 76 may be extended by a tube 212 placed in the furrow 210. In addition, the tube 212 may be provided at its outlet which is situated close to the bottom of the tank, with an endpiece 214 designed to direct the additive away from the reserve bowl 21. The endpiece 214 may be secured to the outlet of the tube 212.

Such an endpiece 214 may be formed by an element presenting an internal duct with a 90° bend and possessing a small outlet bore forming a nozzle.

According to an advantageous characteristic of the present invention, the additive tank 6 is advantageously made of polyoxymethylene.

This material presents very good ability to withstand chemically the aggressive additives used for motor vehicle fuel (for example having solvents based on aromatic compounds derived from benzene rings, toluene, . . . ), and it is suitable for high precision molding. This material is also suitable for heat sealing. It thus enables the containers that are to act as additive tanks to be made with shapes that are accurate and varied, and that are capable of having molded therein all of the necessary fixing elements and electrical and hydraulic connection elements.

Such a material is indeed fragile. Nevertheless, since the additive tank 6 is located inside the fuel tank 1 the drawbacks inherent to said fragility are eliminated.

The additive tank 6 is protected since it is located inside the fuel tank 1. In addition, in the event of breakage, the additive flows into the fuel tank 1 and not to the outside.

It will be observed that the disposition of the additive tank 6 inside the fuel tank 1 makes it possible to improve the ability of a vehicle to conform with fire-safety requirements.

The invention also makes it possible to eliminate any environmental constraint outside the fuel tank. As a result it enables the same type of fuel tank to be used for an entire series of vehicles, regardless of the type of engine (gasoline/diesel) fitted to each vehicle.

It also serves to limit evaporation of additive to the outside of the fuel tank.

Figure 5:
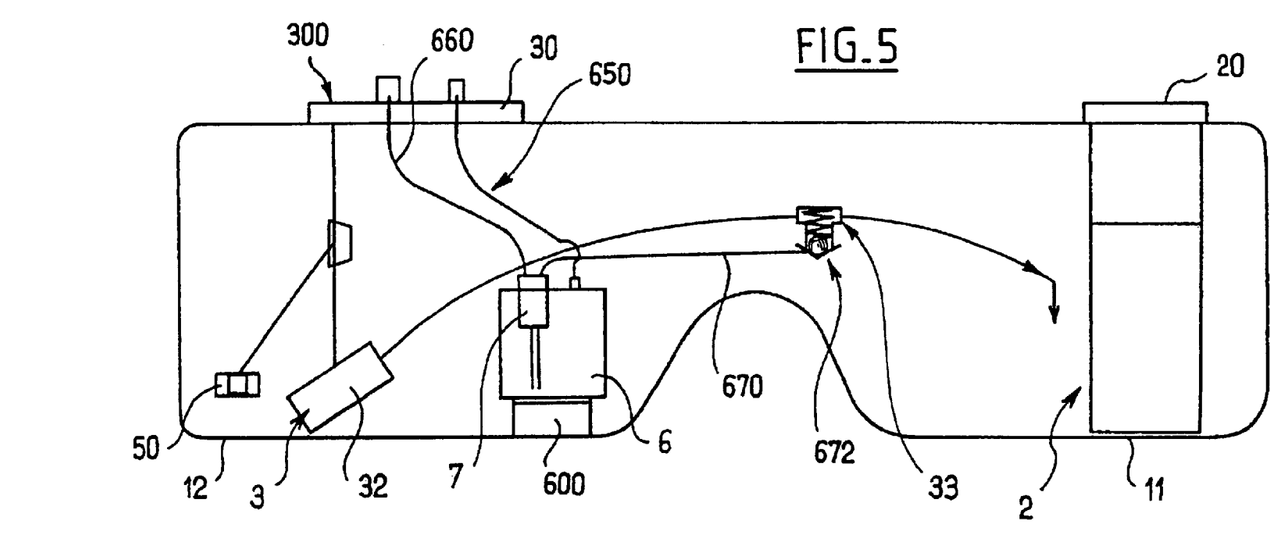
FIG. 5 is a diagrammatic vertical section view showing a variant embodiment in accordance with the present invention.

Accompanying FIG. 5 shows a variant embodiment in accordance with the present invention in which there can be seen a main fuel-drawing assembly 2 in a main compartment 11 and a secondary fuel-drawing assembly 3 in a secondary compartment 12.

The main drawing module 2 is mounted on a baseplate 20.

The secondary drawing module 3 is mounted on a baseplate 30.

In this case, the secondary drawing module 3 is formed by a jet pump 32 fed by a fuel return duct 300 and a fuel gauge 50.

The additive tank 6 has means 600 for holding it in the fuel tank 1.

It includes a duct 650 leading to the outside atmosphere and terminating in the baseplate 30.

The additive tank 6 receives or supports additive pumping/dispensing means 7, e.g. in the form of a metering pump. It is advantageously removable. The pump 7 is powered via an electrical connection 660 terminating in the baseplate 30.

In accompanying FIG. 5, it should be observed that the pump 7 sends the additive for adding to the fuel via a duct 670 which terminates via an injector 672 fixed on the duct 33 for transferring fuel from the secondary compartment 12 to the main compartment 11. The injector 672 is placed in the main compartment 11.

In order to fill the additive tank 6, it suffices to separate the baseplate 30. The additive tank 6 can then be filled via any suitable orifice, e.g. via the pump support orifice 7, after the pump has been removed. In a variant, the additive tank 6 may be replaced by an equivalent tank that has been pre-filled.

Various ways of fixing the additive tank 6 in the fuel tank 1 are described below.

Figure 6:
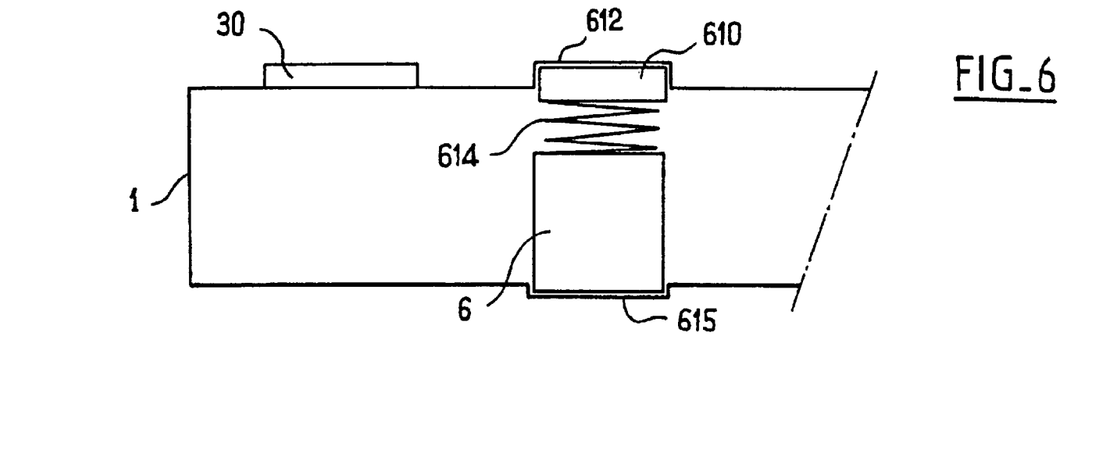
FIG. 6 is a diagrammatic fragmentary vertical section view of another variant embodiment in accordance with the present invention.

FIG. 6 shows a variant embodiment in which the tank 6 is associated with a baseplate 610. The tank 6 is designed to occupy a position in complementary retention means 615 provided in the bottom wall of the fuel tank 1 (integrally molded in said wall or fitted thereto), while the baseplate 610 is designed to take up position in complementary retention means 612 provided in the top wall of the tank 1 (integrally molded therewith or fitted thereto). Resilient means 614 are interposed between the baseplate 610 and the tank 6 so as to urge the tank 6 against the means 615 and the baseplate 610 against the means 612.

The person skilled in the art will understand that on being installed, the resilient urging means 614 are compressed. The tank 6 is automatically held in place when the resilient means 614 are released.

Figure 7:
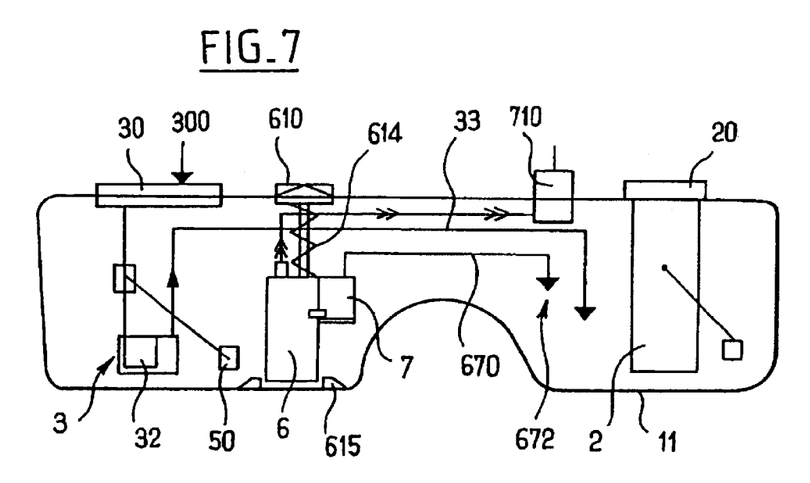
FIG. 7 is a diagrammatic vertical section view of another variant embodiment in accordance with the present invention.

Accompanying FIG. 7 shows a variant of the FIG. 6 embodiment in which the baseplate 610 associated with the additive tank 6 is not adapted to engage with complementary retention means, but the baseplate 610 is adapted to be fixed directly to the top wall of the fuel tank 1.

There also can be seen in FIG. 7 a system 710 for connecting the additive tank 6 to the outside atmosphere. This system 710 preferably includes a check valve for ensuring that the additive tank 6 does not empty in the event of the vehicle accidentally rolling over.

In a variant, the system 710 may be used to connect the fuel tank 1 likewise to the outside atmosphere.

The means 600 serving to hold the additive tank 6 in the fuel tank 1 can be implemented in numerous ways.

These retention means 600 preferably comprise vertical fixing means and horizontal fixing means.

Figure 8:
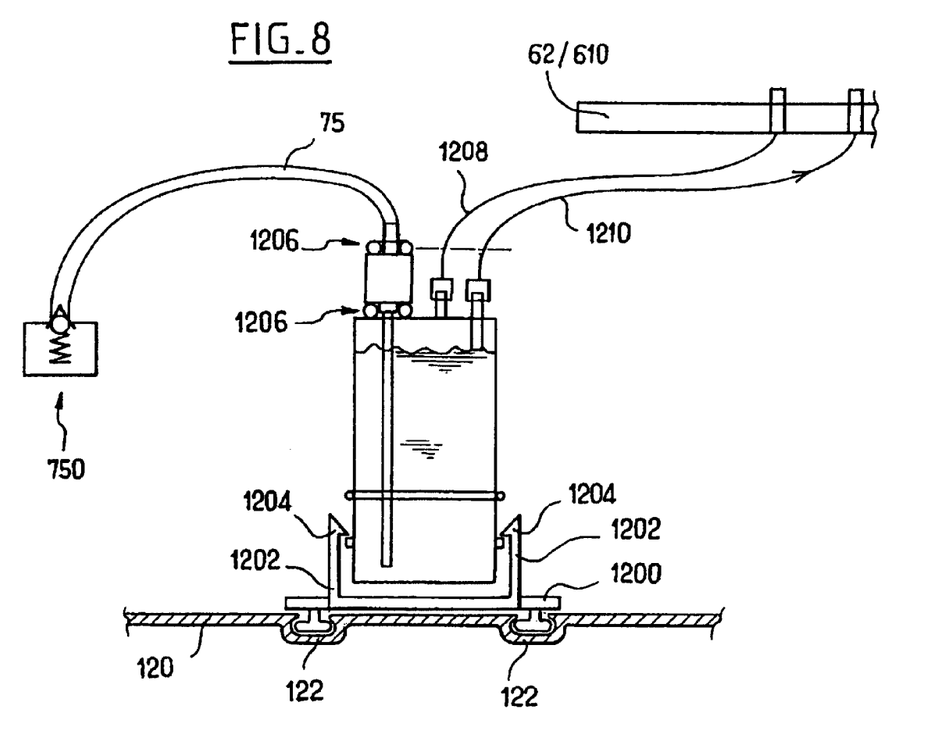
FIG. 8 is a diagram showing vertical fixing means in accordance with et present invention.

Accompanying FIG. 8 shows an example of vertical fixing means.

In FIG. 8, there can be seen a bottom wall of the fuel tank 120 having shapes 122 that are preferably of the type comprising grooves with converging edges, e.g. of dovetail shape, adapted to receive and hold an insert 1200. The insert defines a cage 1202 having resilient tongues with catches 1204 for retaining the base of the additive tank 6.

The insert 1200 may be integrated in the fuel tank 1 while it is being blown.

Accompanying FIG. 8 also shows an additive pump 7 designed to be placed on the top wall of the tank 6 by any suitable fixing means, e.g. using pins 1206 or any equivalent clip means.

The pump 7 opens out into a pipe 75 preferably fitted with a valve 750 at its end.

Accompanying FIG. 8 also shows two auxiliary pipes 1208 and 1210 connecting the top portion of the additive tank 6 to a baseplate 62/610.

The first pipe 1208 is used for ventilating and filling the additive tank 6. This pipe 1208 opens out into the tank 6 flush with the top surface of the top wall thereof.

The second pipe 1210 is preferably closed in operation by a plug or by any equivalent means. It is used to finish off degassing the additive tank 6 when it is filled and to define the maximum level of additive therein. To this end, the pipe 120 dips into the tank 6 to the desired level.

The person skilled in the art will understand by means of this disposition, air escapes from the additive tank 6 while it is being filled so long as the maximum level has not been reached. Once this level has been reached, excess additive is evacuated via the pipe 1210.

In a variant, the pipe 1208 can be omitted. Under such circumstances, in normal operation, the additive tank 6 is degassed by the pipe 1210. During filling, degassing is performed via the orifice of the pump 7, with the pump 7 being withdrawn during filling.

In another embodiment, the additive tank 6 possesses a cylindrical cage secured to its top wall for receiving the pump 7 and plunging into the tank 6 to a height which corresponds to the maximum depth desired for additive in the tank 6.

Such a cage can be used as a filling level indicator that is functionally equivalent to the above-mentioned pipe 1210 while the pump 7 is temporarily removed.

What is claimed is:

1. An on-board fuel feed system for a motor vehicle, the system comprising a fuel tank and a device adapted to introduce additive into fuel, the device comprising an additive tank and pumping device adapted to pump the additive and to direct the additive to an introduction point adapted to introduce the additive into the fuel, wherein the additive tank is housed inside the fuel tank, wherein the fuel tank comprises at least two compartments adapted to receive fuel and that are interconnected, a main compartment containing a main fuel-drawing module adapted to draw fuel for sending to a site of use, a secondary compartment containing a secondary fuel-drawing module provided with a baseplate adapted to be fixed to one of the walls of said secondary compartment and adapted to draw the fuel contained in said secondary compartment to be sent into the main compartment or into the main drawing module, wherein said additive tank is housed inside said secondary compartment of the fuel tank.

2. An on-board fuel feed system for a motor vehicle, the system comprising a fuel tank and a device adapted to introduce additive into fuel, the device comprising an additive tank and pumping device adapted to pump the additive and to direct the additive to an introduction point adapted to introduce the additive into the fuel, wherein the additive tank is housed inside the fuel tank, wherein said additive pumping device is received inside said additive tank.

3. An on-board fuel feed system for a motor vehicle, the system comprising a fuel tank and a device adapted to introduce additive into fuel, the device comprising an additive tank and pumping device adapted to pump the additive and to direct the additive to an introduction point adapted to introduce the additive into the fuel, wherein the additive tank is housed inside the fuel tank, wherein said additive pumping device comprises a metering pump adapted to deliver a measured quantity of additive under the control of a control device.

4. An on-board fuel feed system for a motor vehicle, the system comprising a fuel tank and a device adapted to introduce additive into fuel, the device comprising an additive tank and pumping device adapted to pump the additive and to direct the additive to an introduction point adapted to introduce the additive into the fuel, wherein the additive tank is housed inside the fuel tank, wherein said additive pump device comprises a suction pump, and wherein the additive introduction point is an injector.

5. A system according to claim 3, wherein the additive introduction point is situated on a baseplate of the main drawing module.

6. An on-board fuel reed system for a motor vehicle, the system comprising a fuel tank and a device adapted to introduce additive into fuel, the device comprising an additive tank and pumping device adapted to pump the additive and to direct the additive to an introduction point adapted to introduce the additive into the fuel, wherein the additive tank is housed inside the fuel tank, wherein the additive introduction point is situated on a wall of the main compartment.

7. An on-board fuel feed system for a motor vehicle, the system comprising a fuel tank and a device adapted to introduce additive into fuel, the device comprising an additive tank and pumping device adapted to pump the additive and to direct the additive to an introduction point adapted to introduce the additive into the fuel, wherein the additive tank is housed inside the fuel tank, further including an additive deflection device underlying the additive introduction point and adapted to deflect the delivered additive to outside a reserve bowl of the main drawing module.

8. A system according to claim 1, wherein the secondary drawing module includes a jet pump.

9. A system according to claim 1, wherein said secondary drawing module includes a fuel gauge.

10. A system according to claim 1, wherein the secondary drawing module is housed in a setback formed in a side wall of the additive tank.

11. An on-board fuel feed system for a motor vehicle, the system comprising a fuel tank and a device adapted to introduce additive into fuel, the device comprising an additive tank and pumping device adapted to pump the additive and to direct the additive to an introduction point adapted to introduce the additive into the fuel, wherein the additive tank is housed inside the fuel tank, wherein the additive tank contains a sensor adapted to sense the additive level.

12. A system according to claim 1, wherein the secondary drawing module is mounted on equipment that is movable in vertical translation, said system further comprising resilient device adapted to urge the secondary drawing module towards the bottom of the fuel tank, said secondary drawing module being urged towards the bottom of the fuel tank by the resilient device.

13. An on-board fuel feed system for a motor vehicle, the system comprising a fuel tank and a device adapted to introduce additive into fuel, the device comprising an additive tank and pumping device adapted to pump the additive and to direct the additive to an introduction point adapted to introduce the additive into the fuel, wherein the additive tank is housed inside the fuel tank, further comprising, a valve adapted to be open when the pressure of the additive exceeds a rated threshold of the valve and otherwise to be closed, the valve being located between the additive pumping device and the additive introduction point.

14. An on-board fuel feed system for a motor vehicle, the system comprising a fuel tank and a device adapted to introduce additive into fuel, the device comprising an additive tank and pumping device adapted to pump the additive and to direct the additive to an introduction point adapted to introduce the additive into the fuel, wherein the additive tank is housed inside the fuel tank, wherein the additive introduction point includes a coupling, the coupling having an outlet placed facing a furrow provided in an outside surface of a reserve bowl of the main drawing module.

15. A system according to claim 14, wherein the coupling is extended by a tube located in the furrow.

16. A system according to claim 15, wherein the tube is provided at its outlet, situated close to the base o the tank, with an endpiece designed to direct the additive away from the reserve bowl.

17. An on-board fuel feed system for a motor vehicle, the system comprising a fuel tank and a device adapted to introduce additive into fuel, the device comprising an additive tank and pumping device adapted to pump the additive and to direct the additive to an introduction point adapted to introduce the additive into the fuel, wherein the additive tank is housed inside the fuel tank, wherein the additive tank is made of polyoxymethylene.

18. An on-board fuel feed system for a motor vehicle, the system comprising a fuel tank and a device adapted to introduce additive into fuel, the device comprising an additive tank and pumping device adapted to pump the additive and to direct the additive to an introduction point adapted to introduce the additive into the fuel, wherein the additive tank is housed inside the fuel tank, further including an additive injector carried by a fuel transfer line disposed between a secondary fuel compartment and a main compartment.

19. An on-board fuel feed system for a motor vehicle, the system comprising a fuel tank and a device adapted to introduce additive into fuel, the device comprising an additive tank and pumping device adapted to pump the additive and to direct the additive to an introduction point adapted to introduce the additive into the fuel, wherein the additive tank is housed inside the fuel tank, wherein the additive tank carries a removable pump on a wall of the additive tank so as to enable said additive tank to be filled after the pump is removed.

20. An on-board fuel feed system for a motor vehicle, the system comprising a fuel tank and a device adapted to introduce additive into fuel, the device comprising an additive tank and pumping device adapted to pump the additive and to direct the additive to an introduction point adapted to introduce the additive into the fuel, wherein the additive tank is housed inside the fuel tank, wherein the additive tank is associated with a baseplate, and wherein a resilient device is interposed between the baseplate and the additive tank, the resilient device being adapted to urge the additive tank against a complementary retaining device provided at a bottom wall of the fuel tank and to urge the baseplate against a complementary retaining device provided at a top wall of the fuel tank.

21. An on-board fuel feed system for a motor vehicle, the system comprising a fuel tank and a device adapted to introduce additive into fuel, the device comprising an additive tank and pumping device adapted to pump the additive and to direct the additive to an introduction point adapted to introduce the additive into the fuel, wherein the additive tank is housed inside the fuel tank, wherein the additive tank is associated with a baseplate, a resilient device being interposed between the baseplate and the additive tank, the resilient device being adapted to urge the additive tank against a complementary retaining device provided at a bottom wall of the fuel tank, the baseplate being adapted to be fixed to a top wall of the fuel tank.

22. An on-board fuel feed system for a motor vehicle, the system comprising a fuel tank and a device adapted to introduce additive into fuel, the device comprising an additive tank and pumping device adapted to pump the additive and to direct the additive to an introduction point adapted to introduce the additive into the fuel, wherein the additive tank is housed inside the fuel tank, further including a retention device adapted to retain the additive tank in the fuel tank, the retention device comprising a vertical fixing device and horizontal fixing device.

23. A system according to claim 22, wherein the retention device is provided on an insert adapted to be fixed to the bottom wall of the fuel tank.

24. A system according to claim 23, wherein the insert has a device comprising grooves with converging edges.

25. A system according to claim 23, wherein the insert defines a cage having resilient tongues with catches adapted to retain a base of the additive tank.

26. An on-board fuel feed system for a motor vehicle, the system comprising a fuel tank and a device adapted to introduce additive into fuel, the device comprising an additive tank and pumping device adapted to pump the additive and to direct the additive to an introduction point adapted to introduce the additive into the fuel, wherein the additive tank is housed inside the fuel tank, wherein the additive tank is provided with at least two orifices in a top wall, one of the orifices enabling filling, the other orifice enabling degassing and being associated with a device adopted to determine a maximum depth of the additive.

27. A system according to claim 26, wherein one of the orifices is provided with a pipe which extends inside the additive tank down to a desired maximum depth.

28. A system according to claim 27, wherein the pipe that extends inside the additive tank down to the desired maximum depth forms a cylindrical cage adapted to receive the additive pump.

29. A system according to claim 24, wherein the insert is of a dovetail shape provided in the bottom wall of the fuel tank.

30. A motor vehicle having the fuel feed system according to claim 28.

* * * * *